(12) United States Patent
Brockhoff et al.

(10) Patent No.: US 7,604,283 B2
(45) Date of Patent: Oct. 20, 2009

(54) CABRIOLET

(75) Inventors: Franz Ulrich Brockhoff, Bramsche (DE); Stefan Meinert, Wallenhorst (DE)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 10/568,353

(22) PCT Filed: Aug. 6, 2004

(86) PCT No.: PCT/DE2004/001773

§ 371 (c)(1),
(2), (4) Date: Nov. 27, 2006

(87) PCT Pub. No.: WO2005/016679

PCT Pub. Date: Feb. 24, 2005

(65) Prior Publication Data
US 2007/0176457 A1 Aug. 2, 2007

(30) Foreign Application Priority Data
Aug. 14, 2003 (DE) ................................ 103 37 353

(51) Int. Cl.
*B60J 7/20* (2006.01)

(52) U.S. Cl. .............................. 296/107.08; 296/136.05
(58) Field of Classification Search ................... 296/76, 296/107.08, 108, 116, 136.04, 136.05, 136.06
See application file for complete search history.

(56) References Cited
U.S. PATENT DOCUMENTS

| 6,086,958 | A | 7/2000 | Russell et al. |
| 6,250,707 | B1 * | 6/2001 | Dintner et al. ................. 296/76 |
| 6,325,445 | B1 | 12/2001 | Schenk |
| 6,824,194 | B2 | 11/2004 | Weissmueller et al. |

* cited by examiner

*Primary Examiner*—Dennis H. Pedder
*Assistant Examiner*—Melissa A Black
(74) *Attorney, Agent, or Firm*—Gifford, Krass, Sprinkle, Anderson & Citkowski, P.C.

(57) ABSTRACT

A convertible vehicle with a roof can be folded down under a cover part in a rear section of the vehicle. The cover part can be opened in a first direction to release an opening for luggage and in a second direction to release an opening for the roof. The vehicle includes a movement mechanism to hold the cover part and further includes at least one multi-link chain. The multi-link chain includes a plurality of hinges for the movement of the cover part. At least one of the plurality of hinges is held in an idle state when the cover part is opened in the first direction and the second direction.

8 Claims, 13 Drawing Sheets

CABRIOLET

Figure 1:
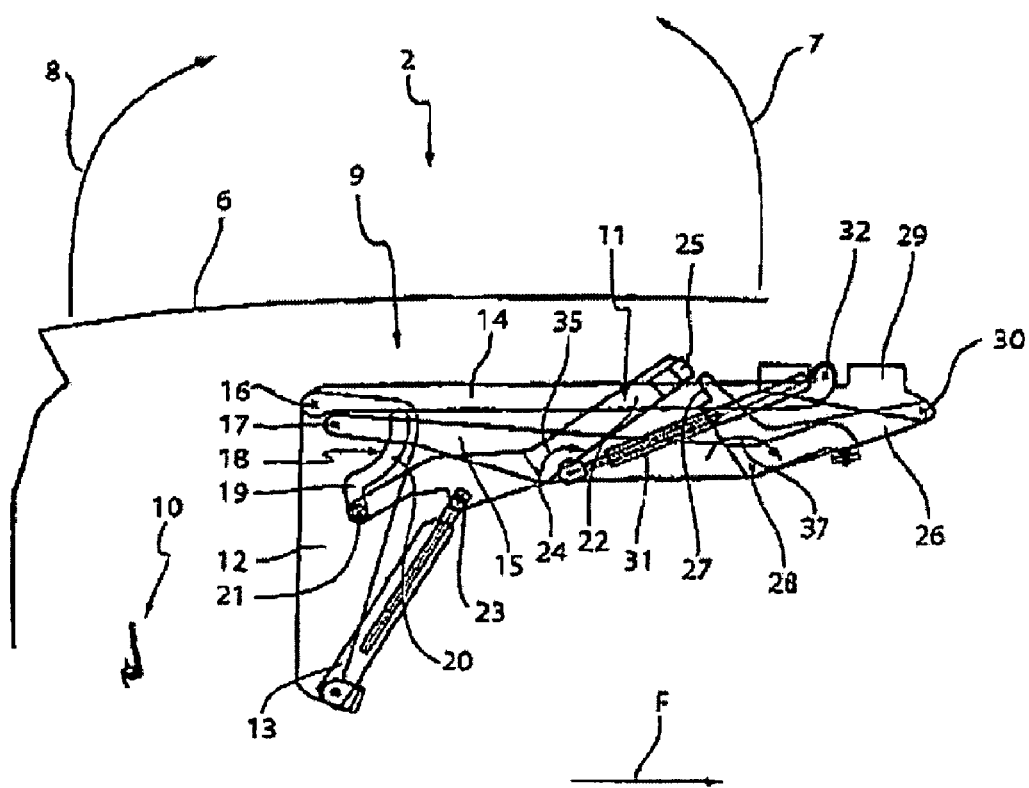

The invention relates to a convertible vehicle with a roof that can be stored below a cover part, whereby the cover part can alternatively be moved in two different movement sequences according to the preamble of Claim 1.

A convertible vehicle is known from DE 44 45 944 C1 that provides a cover part that can be opened in two opposite movement sequences. This is held on an auxiliary frame at the rear end, which swivels around an axle close to the rear end to accomplish a first movement direction and remains non-swiveled to accomplish a second movement direction while then multiple links held on the auxiliary frame open. A design of this type requires a great deal of design complications with a number of pivot points. Besides that, during release of the passage opening for a roof, the cover part swivels around an axis assigned to a lock on the rear end which restricts the design options for the vehicle rear end.

DE 100 51 616 A1 shows a convertible vehicle that also provides a cover part that opens in two opposite movement sequences. For the movement of the cover part to release a passage opening for the roof, a first drive is provided that comprises two levers and a gas spring and for the movement of the cover part for releasing a loading opening for luggage, a second drive is provided that comprises a different control arm group and an associated drive. In this way, in each movement direction it is a case where one of the two gears remains completely inactive and unmoved and thus could be more simply replaced by a rigid component. Because of this, a greater design complication with a number of pivot points also results here.

The invention is based on the problem of improving a convertible vehicle of the type named at the beginning with respect to the opening mechanics of its cover part.

The invention solves this problem by a convertible vehicle with the characteristics of Claim 1. Advantageous designs of the invention can be found in the other Claims 2-8.

According to the invention, it is possible to achieve a case in which both opposite opening movements of the cover part can be effected with the same multi-link mechanism, whereby in each case hinges are used for both opening movements. Thus, no separate hinge arrangements are required for the opening for release of the passage opening for the roof, on one hand, and the movement for release of the loading opening for luggage, on the other. The overall design is thus considerably simplified; also the space requirement in the vehicle and the number of pivot points is minimized. The multi-link mechanisms can be assigned in a space-saving way to the sides of the vehicle without mechanical cross connections.

If each multi-link mechanism provides just one hinge more than is necessary for each of the two movement sequences, the number of pivot points is kept as low as possible, which further improves the simplicity and reliability of the design.

In this case, the rear lock is also not needed as a swivel axis so the cover part can advantageously be lifted out of the lock in both movement sequences and in each case is moved with a swivel movement only by way of the multi-link chain; thus, in the area of the rear lock, no restrictions result for the rear end design.

An advantageous and simple movement kinematic results if a four-bar linkage is active for each movement direction of the cover part, i.e. in total the link chain thus comprises at least five hinges.

In this case, hinges can be different types like, for example, revolute joints or prismatic joints.

In order to design the control of the individual movement sequences so that they are as simple as possible, the blocking of the redundant hinge necessary for the respective movement sequence can be effected mechanically in a guided way by a lock lever. This is especially advantageous for reducing the number of moving parts that can be moved by a drive element which simultaneously serves to cause an opening movement of the cover part.

In addition to the normal closing position, it is advantageously possible to provide a pressing position that is additionally prestressed in the closing direction for the moment of closing, say, by means of an excess pressure of the drive element, whereby an especially reliable secure closing is achieved.

Other advantages and characteristics of the invention will be seen from an embodiment example of the object of the invention shown in the drawing and explained in the following.

Figure 2:
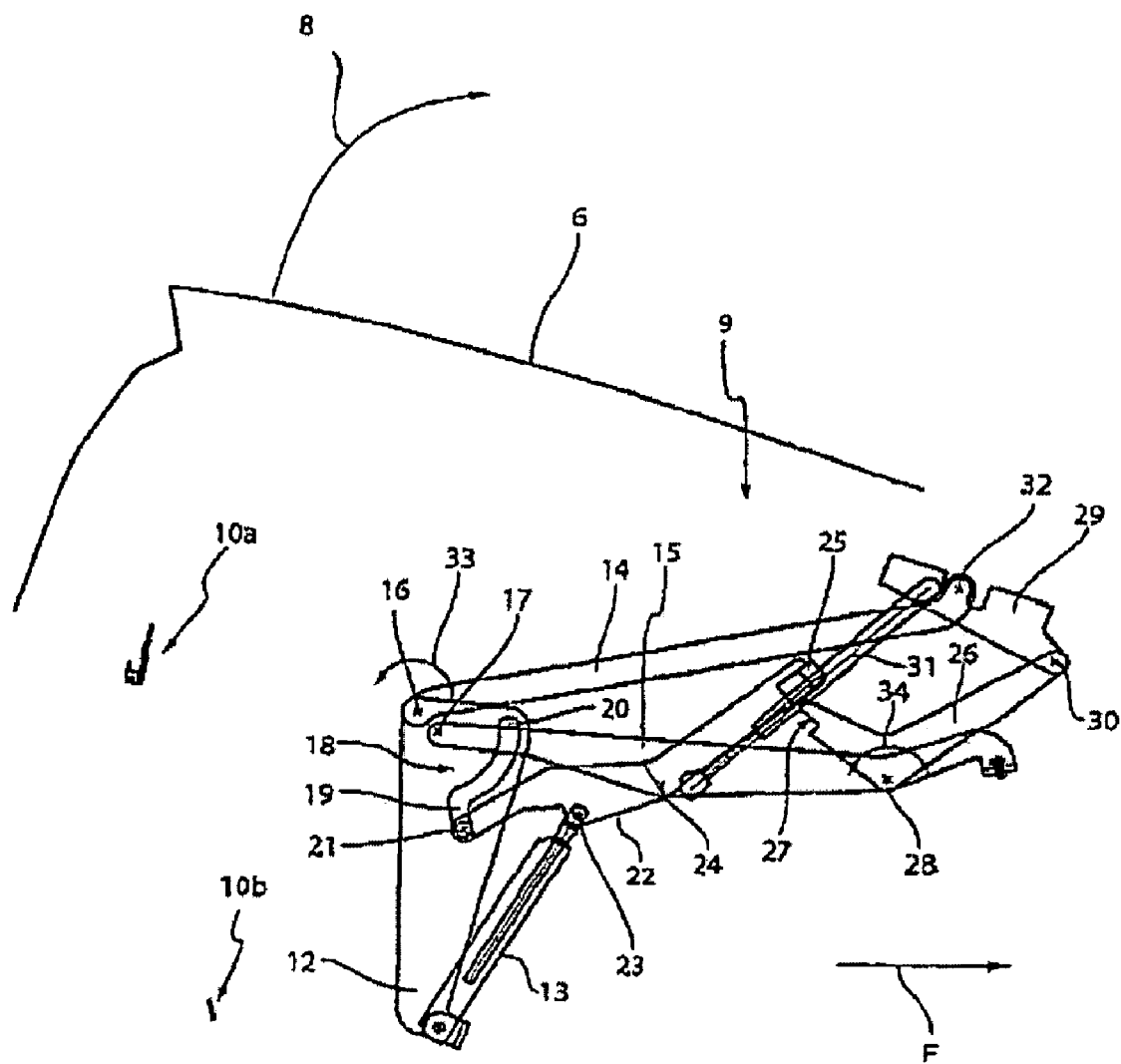
Figure 3:
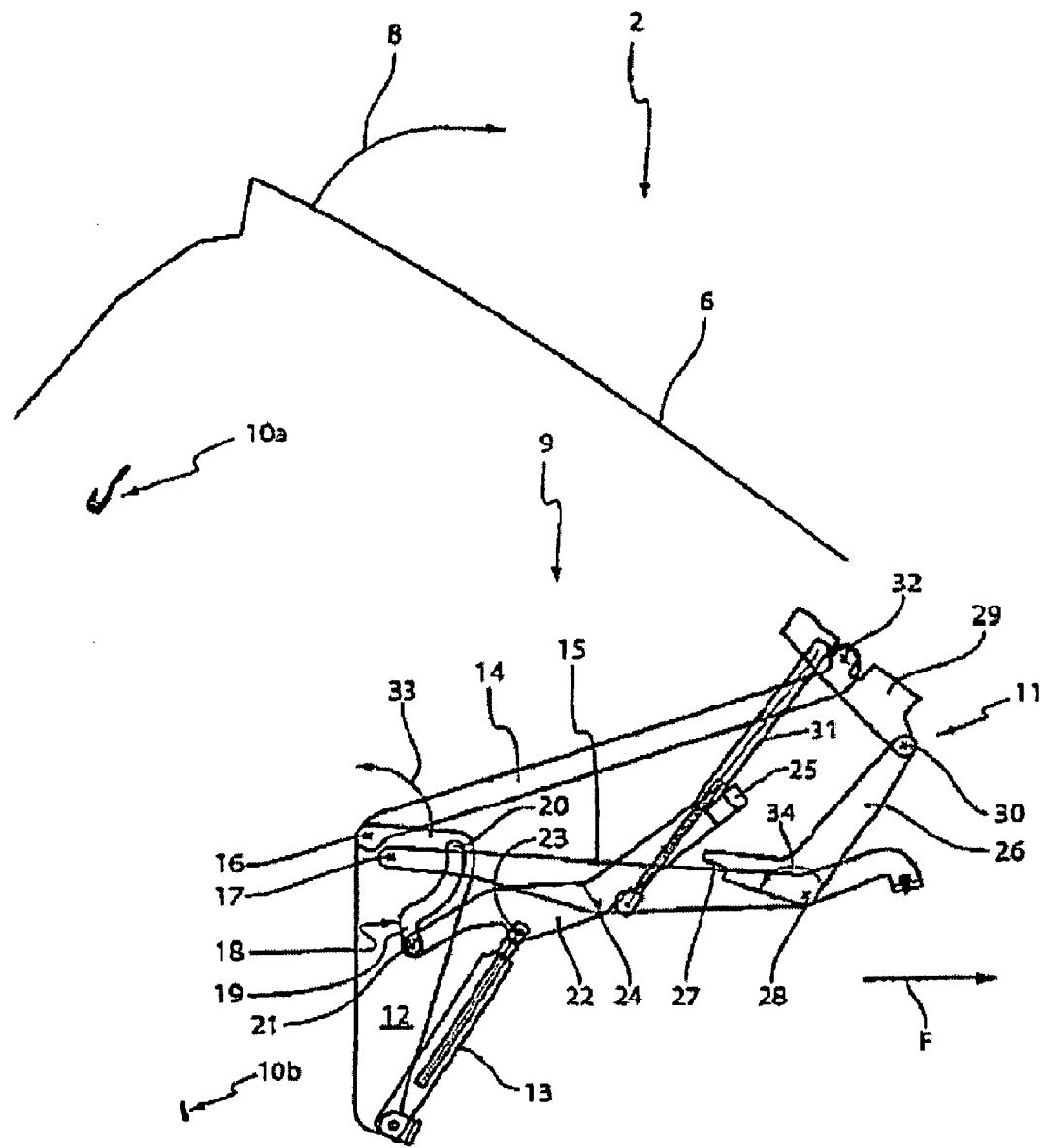
Figure 4:
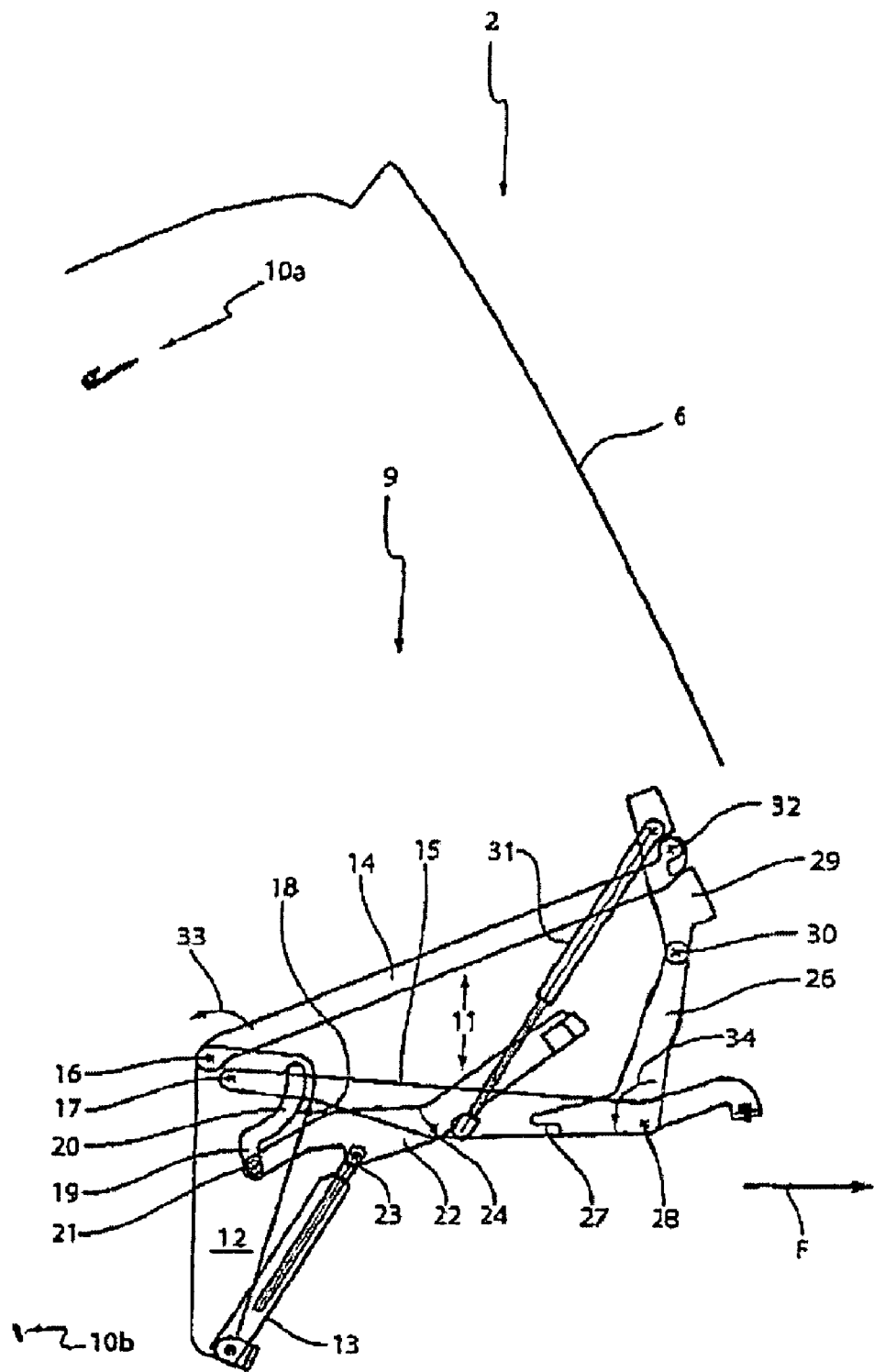
Figure 5:
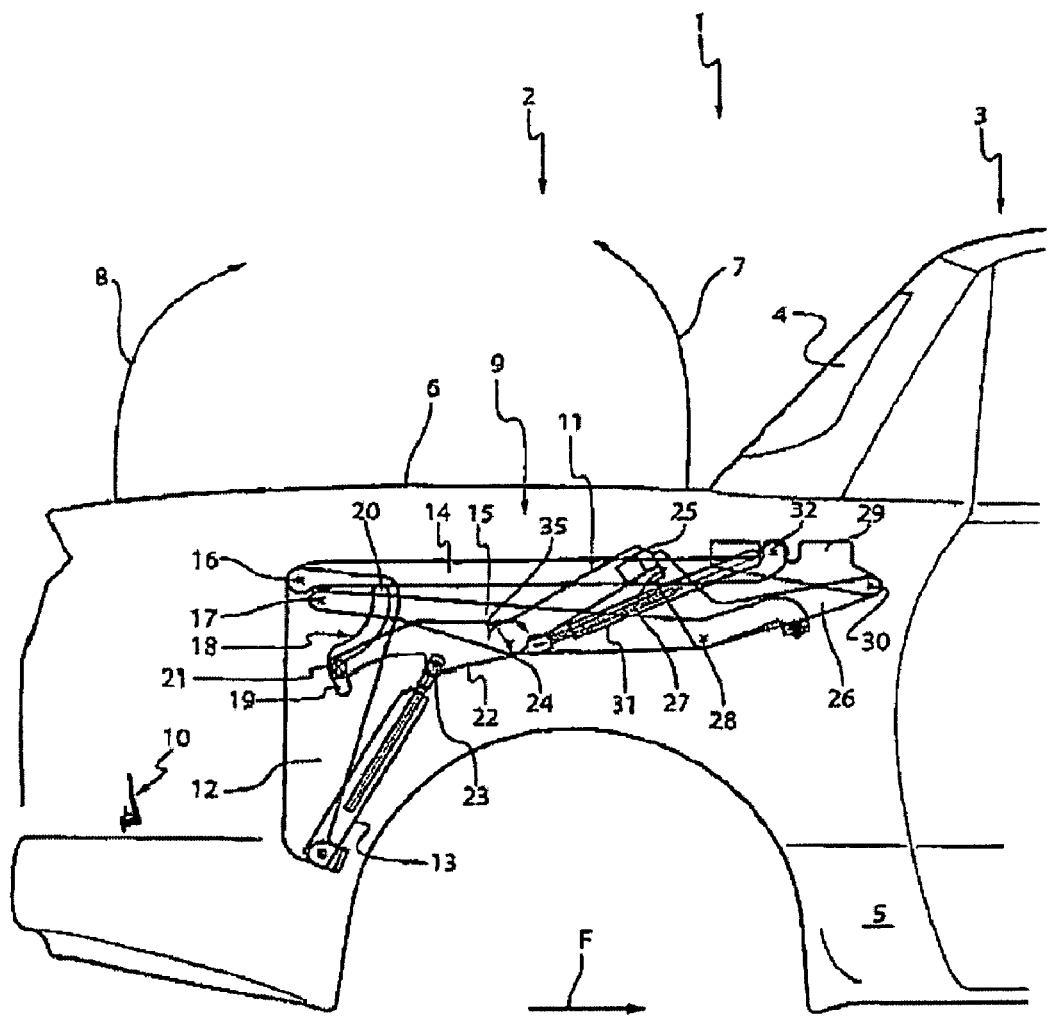
Figure 6:
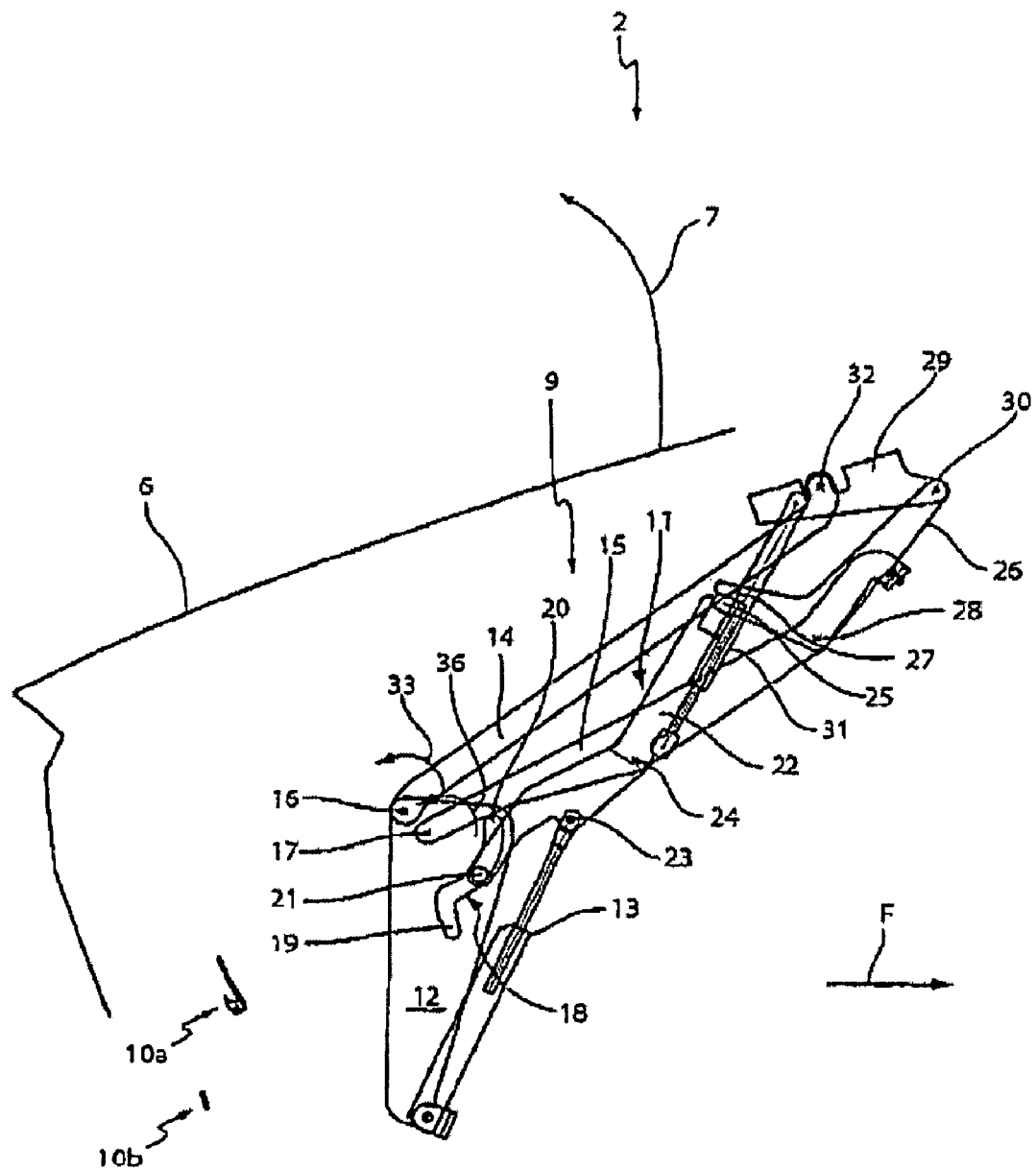
Figure 7:
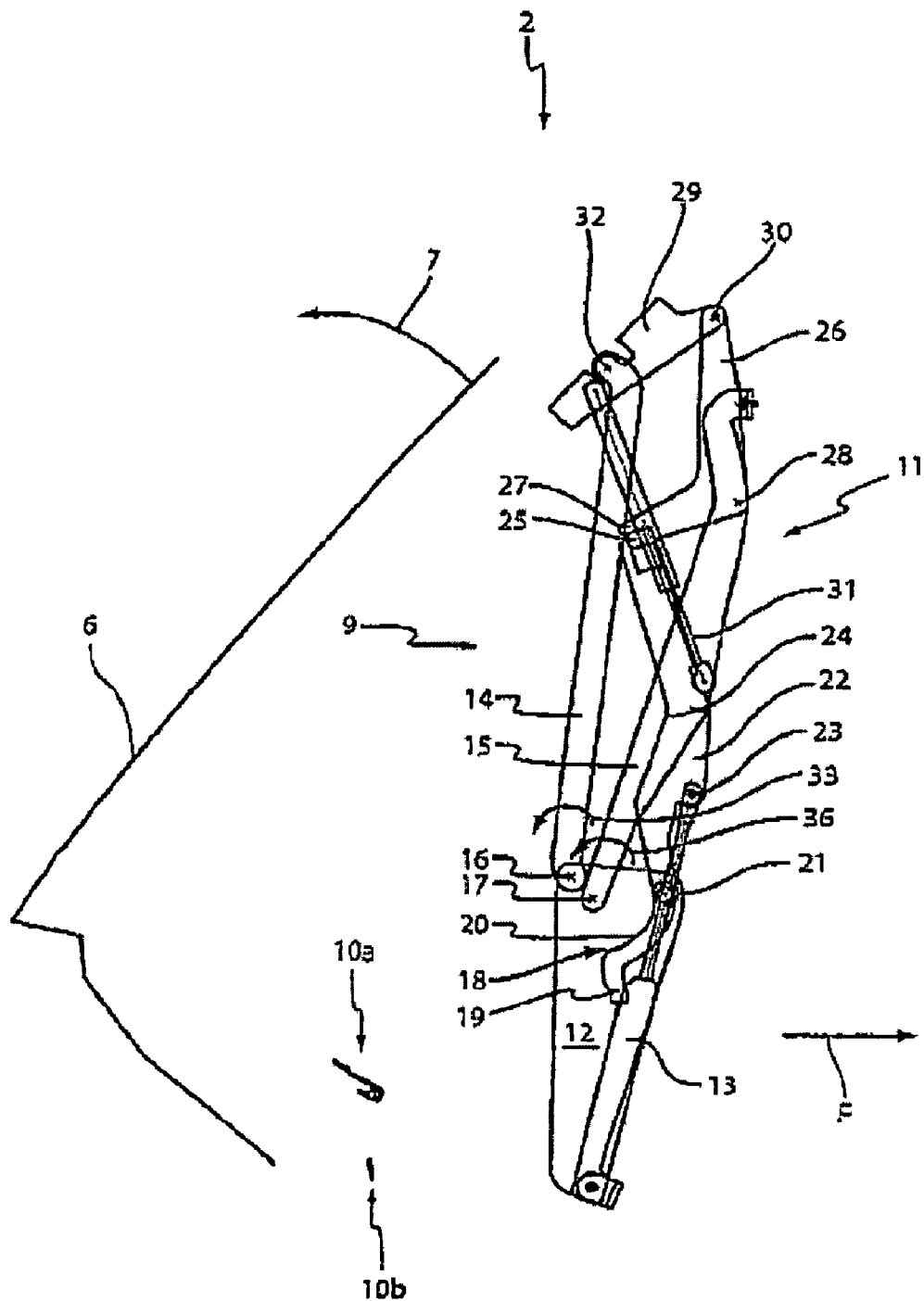
Figure 8:
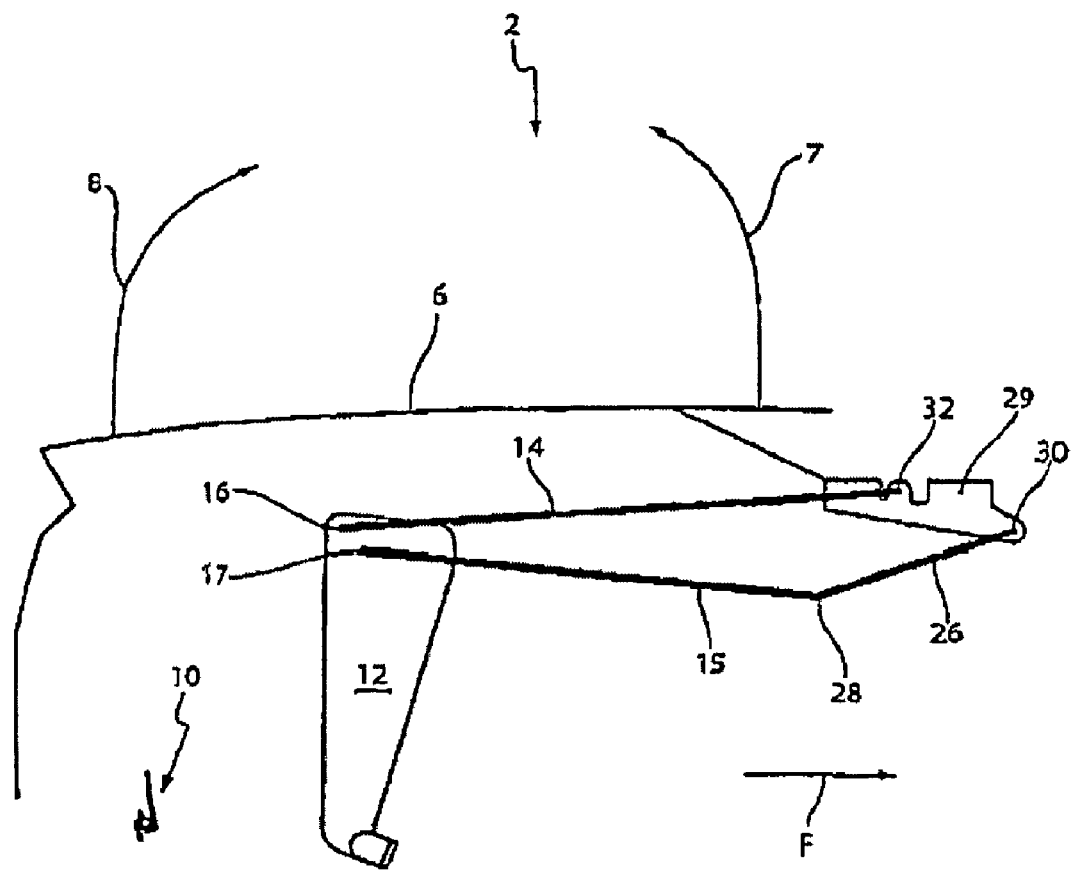
Figure 9:
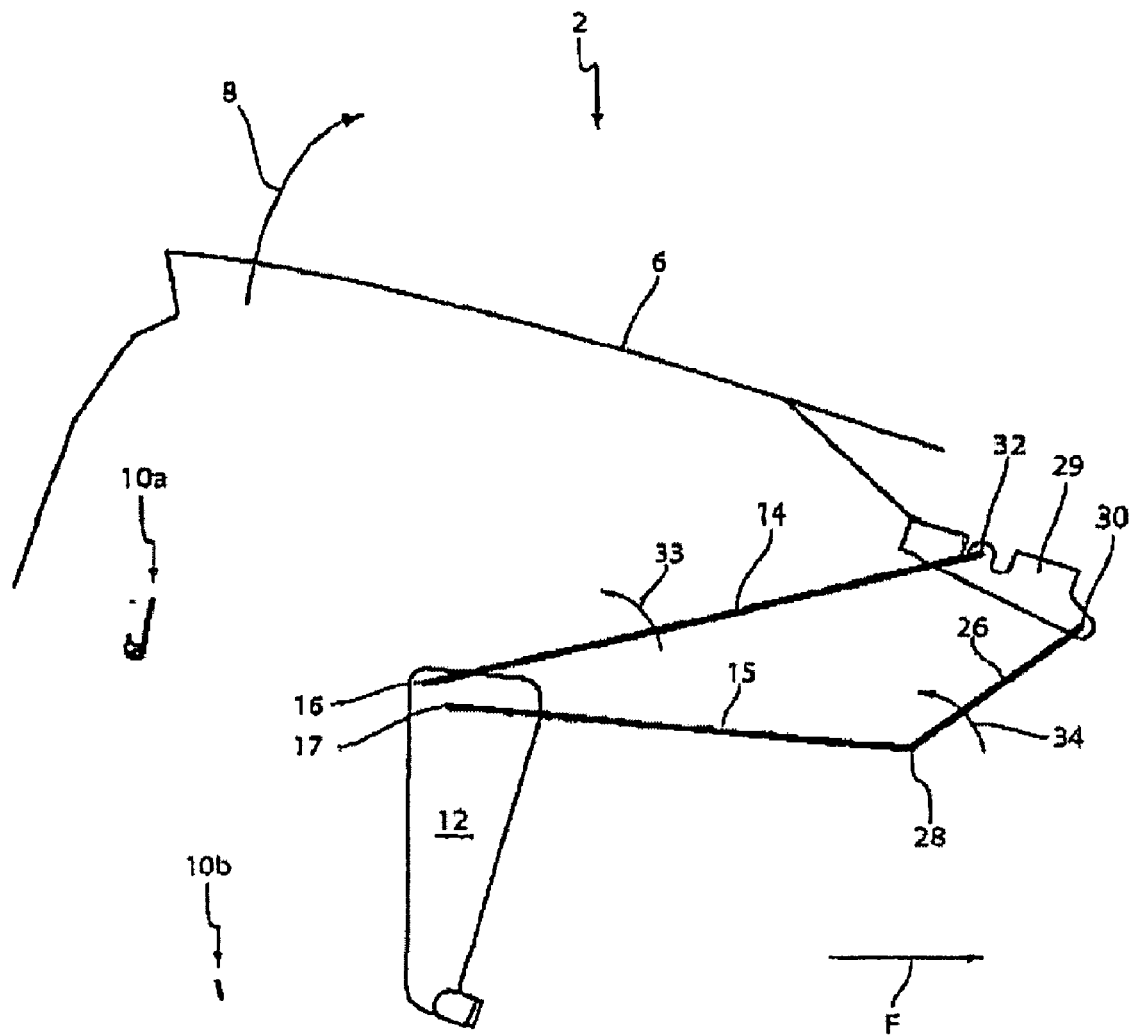
Figure 10:
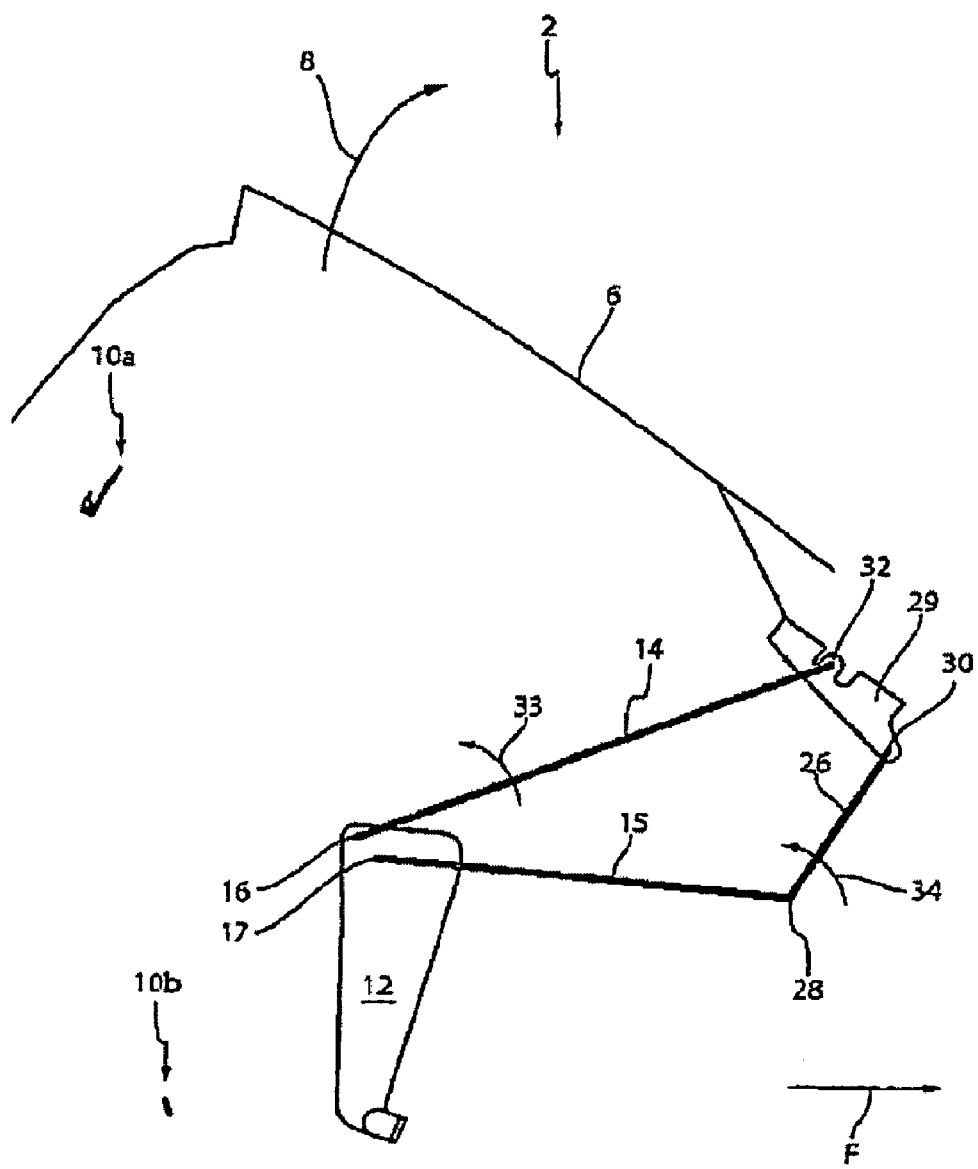
Figure 11:
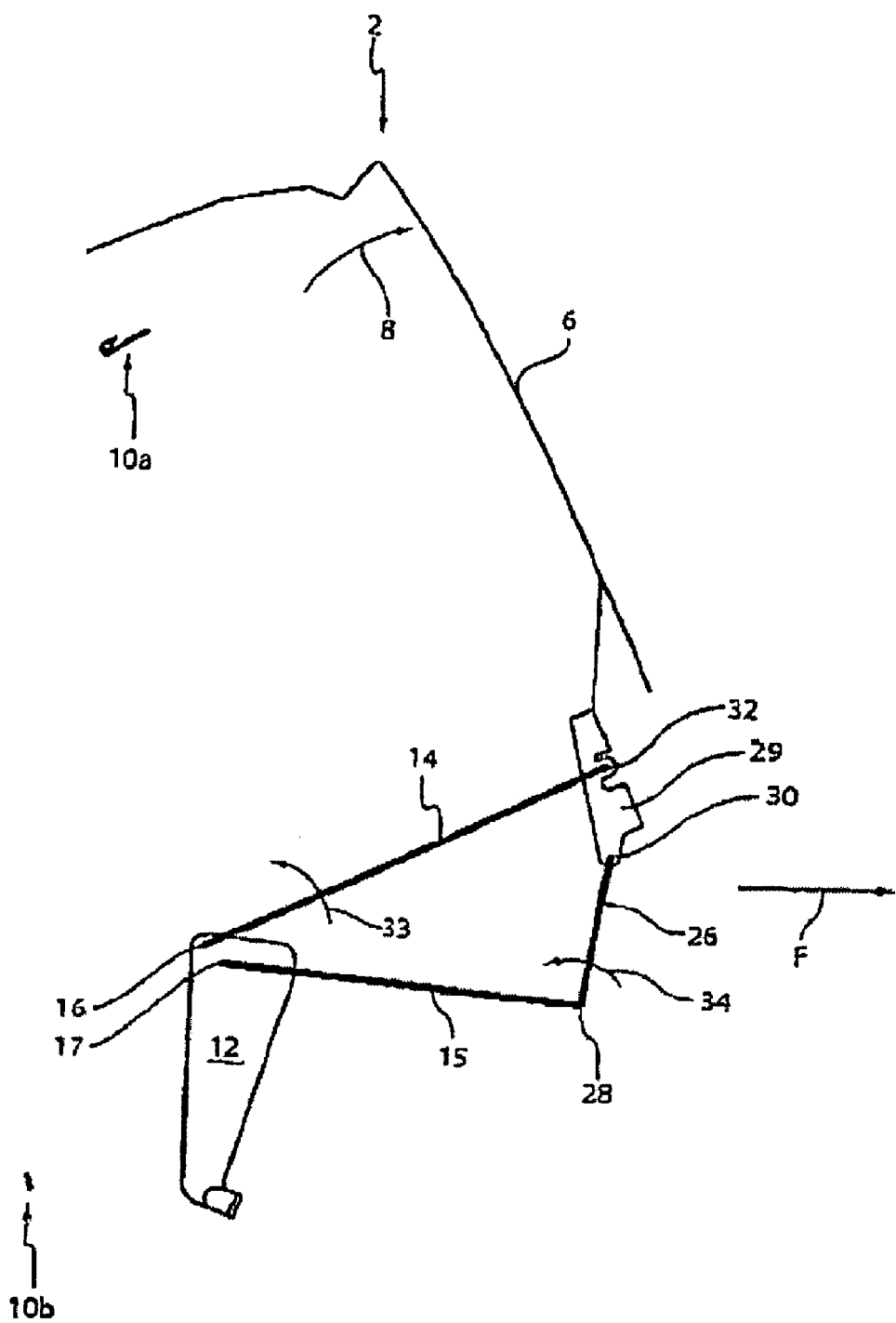
Figure 12:
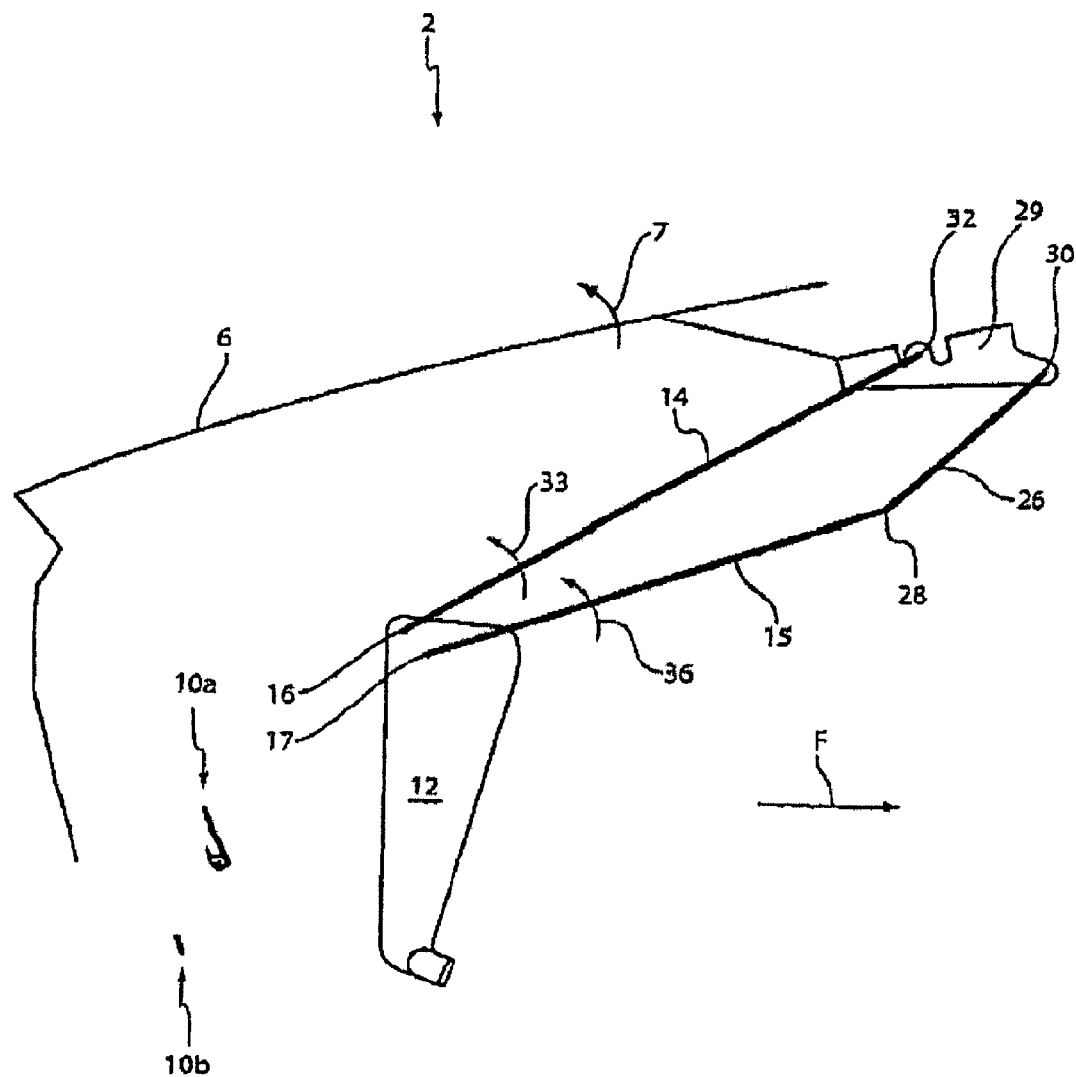
Figure 13:
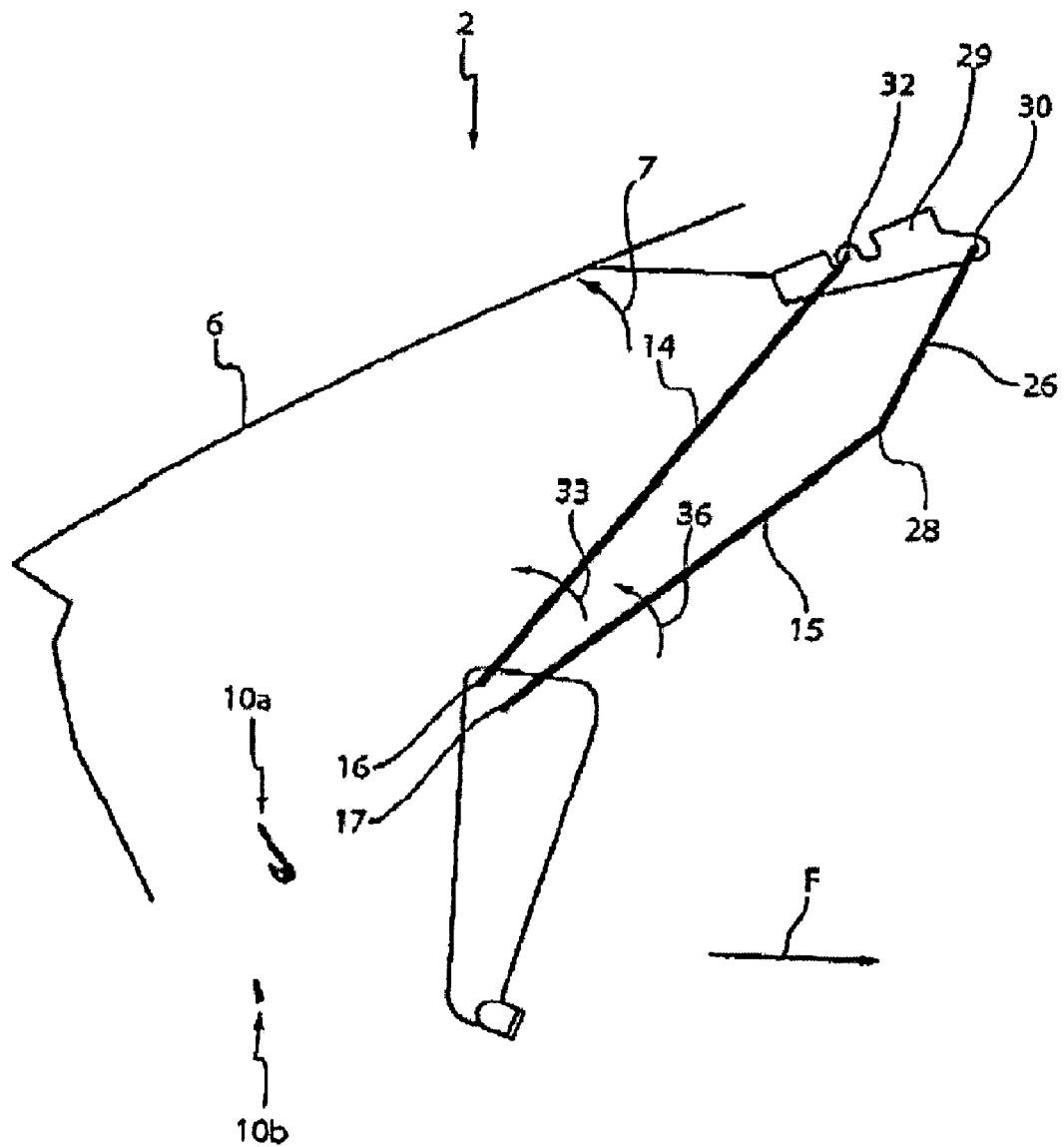

The drawings show:

FIG. 1 a side schematic view of a rear end area of a convertible vehicle according to the invention with the cover part in closed position, FIG. 2 a similar view of the cover part and the associated movement mechanics as in FIG. 1 during the initial opening of the cover part to release a loading opening for luggage, FIG. 3 a view similar to FIG. 2 with the opening of the cover part having progressed further, FIG. 4 a view similar to FIG. 3 with completely open cover part for releasing the loading opening for luggage, FIG. 5 a similar view of the rear end area as in FIG. 1 but with the start of opening of the cover part for releasing the passage opening for the roof and/or in the final phase of closing of the cover part from this movement direction with additional excess pressure acting in the closing direction, FIG. 6 a similar view of the cover part and the associated movement mechanics as in FIG. 5 with opening of the cover part having progressed further to release the passage opening for the roof, FIG. 7 a view similar to FIG. 6 with completely opened cover part for releasing the passage opening for the roof, FIG. 8 a similar representation of the cover part and the movement mechanics as in FIG. 1, but with schematic representation of the active control arm and without drive and lock lever parts or other vehicle parts that do not participate directly in the cover part movement, FIG. 9 a representation similar to FIG. 2, but with schematic representation of the active control arm and without drive and lock lever parts, FIG. 10 a representation similar to FIG. 3, but with schematic representation of the active control arms and without drive and lock lever parts, FIG. 11 Shows a representation similar to FIG. 4, but with schematic representation of the active control arms and without drive and lock lever parts, FIG. 12 a representation similar to FIG. 6, but with schematic representation of the active control arms and without drive and lock lever parts, FIG. 13 Shows a representation similar to FIG. 7, but with schematic representation of the active control arms and without drive and lock lever parts.

FIG. 1 shows a rear end area 2 of a convertible vehicle that is designated overall with 1; this comprises a movable roof 3 that can partially, or as in this case completely, consist of rigid parts or can also be provided, outside a rear window 4, with a flexible covering. For its opening, the roof can be stored in the body 5 below a cover part 6 in a convertible top storage recess.

In order to make it possible to release a passage opening for the roof 3, the cover part 6 can be swiveled in an opening movement direction in the direction of arrow 7 (FIGS. 6, 7) and for closing can be swiveled back opposite the arrow 7. Besides that, the cover part 6 can be opened in an opposite opening direction for releasing a loading opening for luggage in the manner of a luggage compartment lid (FIG. 2 to FIG. 4) in the direction of arrow 8 and closed opposite this direction. To make these two opening and closing movements possible, the cover part 6 is held so that it can move in a moving mechanism designated overall with 9 that comprises a link chain 11. In FIG. 1, the cover part 6 is additionally held on a rear lock 10, from which it can be released completely during each opening movement, which is not mandatory for the release 7 of the passage opening for the roof 3 but, as explained above, is advantageous. The lock 10 comprises a lock part 10a that moves along with cover part 6 and a lock part 10b held on the body 5.

The moving mechanism 9 in this embodiment example comprises a bearing mount 12 on the body of which a drive element 13 and two control arms 14, 15 are held so that they can move by way of hinges 16, 17. The entire rear lid 6 can, therefore, be installed together with its moving mechanisms 9 as a module in body 5. A separate mounting of the drive element 13 is also conceivable. The bearing mount 12 also comprises a recessed crank 18 with a first arc segment 19 that follows a large radius and runs around the swivel axis 24 of a lock lever 22 that is explained further below and a second arc segment 20 that runs around the swivel axis of hinge 17.

In crank 18, a pin or axle journal 21 of the lock lever 22 is guided on which the drive element 13 engages on another mounting point 23 at a distance from guide 21. The lock lever 22 is connected to the control arm 15 outside the guide 21 on link 24 so that it can rotate with control arm 15. In addition, the end 25 of lock lever 21 that is turned away from guide 21 is provided for an adherence-activated engagement on a latch end 27 of another control arm 26.

Instead of being moved by the drive element 13, which can also cause the movement of the cover part 6, lock lever 22 could be moved by its own drive, say by one that is electrically, pneumatically or hydraulically operated. Use of e.g. Piezo crystals can also be considered in order to block individual links.

On one hand, control arm 26 is held on lever 15 by way of hinge 28 and, on the other, connected on a cover-side bearing mount 29 so that is can swivel by way of hinge 30.

Between lever 15 and the cover-side bearing mount 29, or possibly another suitable control arm of the mechanism, another drive or drive-supporting element 31 extends, designed here as a gas pressure cylinder. This makes the luggage compartment opening easier.

Another hinge 32 is assigned to the cover-side bearing mount 29 as a bearing point for the control arm 14 held on the other end on bearing mount 12 of body 5. This thus extends directly between body 5 and cover part 6, while in contrast the other arm 15 supported on bearing mount 12 extends between body 5 and intermediate hinge 28 and the lever 26 that is connected to its extends between this intermediate hinge 28 and the cover part 6.

In order to open cover part 6 from the closed position (FIG. 1), in the first movement direction in the direction of arrow 8 for releasing the loading opening for luggage (FIG. 2 to FIG. 4), or then to close it opposite the direction of arrow 8, the drive element 13 remains unmoved in its run-in position. Because of this, lock lever 22 is also forcefully held unmoved. Its bearing journal 21 is then forcefully held unmoved in section 19 of crank 18 and cannot move upward. Thus the lever 15 is prevented from a swivel movement because of the coupling of lock lever 22 in link 24. Its body-side hinge 17 is thereby blocked for this movement direction. Of the five hinges 16, 17, 28, 30, 32 of the multi-link arrangement 11 with the control arms 14, 15, 26, as well as the body-side bearing mount 12 and the cover part-side bearing mount 29, only the four hinges 16, 28, 30, 32 remain movable.

The opening can be driven by element 31 or during manual opening can be supported by it. During the opening of the cover part 6 in the direction of arrow 8, because of the blocking of hinge 17, only the control arms 14 swivel around hinge 16 in the direction of arrow 33 and control arms 26 swivel around the hinge 28 in the direction of arrow 34. In this process, they bring with it the bearing mount 29 connected to cover part 6 by way of hinges 30, 32 according to the known kinematics of four-link mechanisms.

FIGS. 9 to 11 schematically show the kinematics of the moving mechanism 9 again similar to FIGS. 2 to 4, but schematically and without the drives 13, 31 and without the lock lever 22 and its function. It is clear that for the direction of movement described, not all five hinges 16, 17, 28, 30, 32 are active, but only the four-hinge mechanism 16, 28, 30, 32 because of the blocking of hinge 17.

In contrast, in order to move the cover part 6 from the closed position (FIG. 1) in the second movement direction in the direction of arrow 7 to release the passage opening for the roof (FIG. 5 to FIG. 7), the drive element 13 drives out far enough (FIG. 5) until the pin 21 of the lock lever 22 that is moved along by the drive 13 by way of connection 23, enters into the second arc segment 20 of the crank 18. Because of this, when the piston of the drive element 13 slides out further, the bearing journal 21 in the crank 19 runs around the axis of hinge 17. In this way, lever 15 can be swiveled because of the coupling of lock lever 22 in link 24. Because of this, its body-side hinge 17 is released for this movement direction—in contract to above.

As can be seen in the first movement phase, in which the journal 21 still runs in the first, only slightly curved part 19 of the crank by the sliding out of the drive element 13 (transition from FIG. 1 to FIG. 5), at first the swivel movement of link 15 is still blocked. The consequence of this is that the lock lever 22 swivels downward a little in the direction of arrow 35 around link 24 in this phase and, with its head 25, comes in contact with a recessed area 27 of control arm 26. Because of this, its swiveling in the direction of arrow 34 around the intermediated hinge 28 is blocked. This blocking is maintained during the entire movement in this opening direction. Of the five hinges 16, 17, 28, 30, 32 of the multi-link arrangement 11, thus only the four hinges 16, 17, 30, 32 remain movable in this movement direction. The opening or closing can usually be caused completely by element 13. During opening of the cover part 6 in the direction of arrow 7, because of the blocking of hinge 28, only the control arm 14 swivels around the hinge 16 in the direction of arrow 33 and the control arm 15 around the hinge 17 in the direction of arrow 36. In this process, they bring with them the bearing mount 29 that is tightly connected to cover part 6 by way of hinge 32 and the control arm 26 that is now rigidly connected to control arm 15 and its hinge 30 according to known kinematics of a four-hinge mechanism.

FIGS. 12 to 13 again show the kinematics of the moving mechanism 9 similarly to FIGS. 6 and 7, but schematically and without the drives 13, 31 and without the lock lever 22 and its function. It is clear that for the direction of movement described here from the closing position according to FIG. 8 not all five hinges 16, 17, 28, 30, 32 are active but, because of the blocking of hinge 28, only the four-hinge mechanism 16, 17, 30, 32 is active. Therefore, in this cover part movement the control arms 15 and 26 act like a common control arm.

As above, the five-hinge mechanism 16, 17, 28, 30, 32 is also reduced to a four-hinge mechanism in this direction of movement, whereby instead of the blocking of hinge 17 in the opening and closing directions described above, in this case hinge 28 is blocked.

Instead of the reduction of a five-hinge mechanism to a four-hinge mechanism, it would also be possible, for example, to block an eight-hinge mechanism so it becomes an active seven-hinge mechanism or even to block several hinges and thus, for example, to reduce a six-hinge mechanism for a respective movement direction to a four-hinge mechanism to block at least one other hinge and for the opposite displacement of cover part 6.

As in the initial opening or the end phase of the closing according to FIG. 5, it becomes clear in comparison to the non-loaded and continuing closed position according to FIG. 1, that the design according to the invention also offers the possibility that the multi-link chain 11 can be moved during closing of the cover part 6 while the running in of drive element 13 can be moved into a pressure-loaded downward pressed position. Because of this, an especially reliable closing of lock 10 can be achieved so that even with movement 7 in the direction of release of the passage opening for the roof, this can be lifted completely out of the lock 10 with no problems and the lock axis will not be needed as the swivel axis. In the position according to FIG. 5 that is run through both during opening and during closing of cover part 6, lock lever 22 is moved downward a little around the link 24 in the direction of arrow 35 and, with its head 25, comes in contact with a recessed area 27 of control arm 26. Because of an excess dimension of head 25, the control arm 26 is simultaneously pressed downward around hinge 28 a little further in the direction of arrow 37 and in this process pulls the cover part 6 downward with it whereby it is pressed into the lock 10, which during closing causes the reliability advantages described above.

The invention claimed is:

1. A motor vehicle, comprising:
   a vehicular body having a front section and a rear section and at least two longitudinal sides;
   a retractable roof;
   a cover panel in the rear section of the vehicular body, the cover panel capable of moving in a first direction to allow the roof to be stored in the vehicular body and capable of moving in a second direction to allow luggage to be stored in the vehicular body; and
   a multi-link movement device provided on the longitudinal sides of the vehicular body and capable of moving the cover part in the first direction and the second direction, said multi-link movement device including a plurality of hinges which are movable to allow movement of the cover part in the first direction and the second direction, wherein at least one of the plurality of hinges is held in an idle state when the cover part is moved in the first direction and at least another of the plurality of hinges is held in an idle state when the cover part is moved in the second direction.

2. The motor vehicle as claimed in claim 1, wherein the cover panel is held only by the multi-link movement device when the cover part is moved in the first and second directions.

3. The motor vehicle as claimed in claim 2, wherein the multi-link movement device comprises a plurality of control arms for moving the cover panel.

4. The motor vehicle as claimed in claim 3, wherein the plurality of control arms include a first, second, and third control arm, the first control arm being positioned between a first hinge and a second hinge, the second control arm being positioned between a third hinge and a fourth hinge, and the third control arm being positioned between the fourth hinge and a fifth hinge.

5. The motor vehicle as claimed in claim 4, wherein when the cover panel is moved in the second direction, the second control arm is held in an idle state.

6. The motor vehicle as claimed in claim 4, wherein when the cover panel is moved in the first direction, the fourth hinge is held in an idle state.

7. The motor vehicle as claimed in claim 4, wherein the multi-link movement device further comprises at least one locking lever for holding the third hinge and the fourth hinge in an idle state.

8. The motor vehicle as claimed in claim 7, wherein the multi-link movement device further comprises a drive element for moving the at least one locking lever.

* * * * *

UNITED STATES PATENT AND TRADEMARK OFFICE
CERTIFICATE OF CORRECTION

PATENT NO. : 7,604,283 B2 Page 1 of 1
APPLICATION NO. : 10/568353
DATED : October 20, 2009
INVENTOR(S) : Brockhoff et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 30 days.

Signed and Sealed this

Fifth Day of October, 2010

David J. Kappos
*Director of the United States Patent and Trademark Office*